United States Patent
Dong (10) Patent No.: US 11,297,107 B2
(45) Date of Patent: Apr. 5, 2022

(54) MESSAGE QUEUING TELEMETRY TRANSPORT (MQTT) DATA TRANSMISSION METHOD, APPARATUS, AND SYSTEM

(71) Applicant: Siemens Aktiengesellschaft, Munich (DE)

(72) Inventor: Xiao Rui Dong, Qingdao (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/954,245

(22) PCT Filed: Dec. 28, 2017

(86) PCT No.: PCT/CN2017/119485
§ 371 (c)(1),
(2) Date: Jun. 16, 2020

(87) PCT Pub. No.: WO2019/127241
PCT Pub. Date: Jul. 4, 2019

(65) Prior Publication Data
US 2021/0144176 A1    May 13, 2021

(51) Int. Cl.
*H04L 29/06* (2006.01)
*H04L 29/08* (2006.01)
*H04L 67/12* (2022.01)

(52) U.S. Cl.
CPC .............. *H04L 63/18* (2013.01); *H04L 67/12* (2013.01)

(58) Field of Classification Search
CPC ....... H04L 63/18; H04L 67/12; H04L 63/101; H04L 63/166; H04L 63/0428;
(Continued)

(56) References Cited

U.S. PATENT DOCUMENTS 10,554,726 B1 * 2/2020 Mattison ............... H04L 67/025
2015/0281294 A1 10/2015 Nur et al.
(Continued)

FOREIGN PATENT DOCUMENTS

CN 104158816    11/2014
CN 105072149 A  11/2015
(Continued)

OTHER PUBLICATIONS

Bisne, Lochan et al.: "Composite secure MQTT for Internet of Things using ABE and dynamic S-box AES"; 2017 Innovations in Power and Advanced Computing Technologies (I-PACT); IEEE; Apr. 21, 2017; pp. 1-5; XP033287812; DOI: 10.1109/IPACT.2017.8245126; 2017.
Meena, Singh et al.: "Secure MQTT for Internet of Things (IoT)"; 2015 Fifth International Conference On Communication Systems and Network Technologies; IEEE; Apr. 4, 2015; pp. 746-751; XP033221202; DOI: 10.1109/CSNT.2015.16; 2015.
(Continued)

*Primary Examiner* — Mohammed Waliullah
(74) *Attorney, Agent, or Firm* — Harness, Dickey & Pierce, P.L.C.

(57) ABSTRACT

The present application relates to the field of Internet of Things technologies, and in particular, to a message queuing telemetry transport (MQTT) data transmission method, apparatus, and system, so as to provide a solution for simply implementing a security function of the MQTT protocol. A data obtaining relationship between an MQTT publishing device and an MQTT subscribing device is verified before MQTT data publishing, and data sending is controlled by using an SDP gateway. Therefore, security of the MQTT data publishing can be effectively ensured. Moreover, protocol modification is relatively little, and implementation is simple.

9 Claims, 5 Drawing Sheets

(58) Field of Classification Search
CPC ... H04L 63/0272; H04L 63/168; H04L 67/26; H04W 12/08; H04W 12/03; H04W 12/033; H04W 4/70
See application file for complete search history.

(56) References Cited

U.S. PATENT DOCUMENTS

| | | | |
|---|---|---|---|
| 2016/0028780 | A1 | 1/2016 | Verzano |
| 2017/0005999 | A1* | 1/2017 | Choyi ................. H04W 12/086 |
| 2017/0094033 | A1 | 3/2017 | Vidyapeetham |
| 2018/0376107 | A1* | 12/2018 | Shibaev ................ G06F 3/0488 |
| 2019/0081980 | A1* | 3/2019 | Luo ......................... G06F 21/53 |

FOREIGN PATENT DOCUMENTS

| | | |
|---|---|---|
| CN | 105656847 A | 6/2016 |
| CN | 105959656 A | 9/2016 |
| CN | 106817341 A | 6/2017 |
| CN | 107018147 A | 8/2017 |

OTHER PUBLICATIONS

ANONYMOUS:"Waverley Labs Pioneers Open Source Version of CSA's Software-Defined Perimeter Specification"; Aug. 21, 2017; XP055802195; URL: https://www.activecyber.net/waverley-labs-pioneers-open-source-version-csas-software-defined-perimeter-specification/ [retrieved on May 6, 2021]; 2017.

Pipatsakulroj, Wiriyang et al.: "muMQ: A Lightweight and Scalable MQTT Broker"; 2017 IEEE International on Local and Metropolitan Area Networks (LANMAN); Nov. 7, 2017.

Upadhyay, Yuvraj et al: "MQTT Based Secured Home Automation System"; 2016 Symposium on Colossal Data Analysis and Networking (CDAN); Sep. 9, 2016.

Fangyong, Tan et al.: "Design and Implementation of the IOT Gateway Communication Framework Based on ZigBee and MQTT"; Software Engineering; vol. 20, No. 4, Year: Apr. 5, 2017, pp. 43-45.

Chinese Office Action dated Oct. 8, 2021.

Extended European Search report dated May 18, 2021.

* cited by examiner

MESSAGE QUEUING TELEMETRY TRANSPORT (MQTT) DATA TRANSMISSION METHOD, APPARATUS, AND SYSTEM

PRIORITY STATEMENT

This application is the national phase under 35 U.S.C. § 371 of PCT International Application No. PCT/CN2017/119485 which has an International filing date of Dec. 28, 2017, which designated the United States of America, the entire contents of which are hereby incorporated herein by reference.

BACKGROUND OF THE INVENTION

Field

Embodiments of the present application generally relate to the field of Internet of Things technologies, and in particular, to a Message Queuing Telemetry Transport (MQTT) data transmission method, apparatus, and system.

Background

MQTT is a broker-based message transport protocol. In MQTT, a message is transmitted in a subscribing/publishing manner, one message publisher sends to-be-published data to one broker, and at least one message subscriber obtains the data from the broker.

The MQTT protocol is widely applied to the Internet of Things. In the past, the MQTT protocol is generally applied to a back-end network with security guarantee. Currently, using an industrial system as an example, each of key devices such as a programmable logic controller (PLC) and a supervisory control and data acquisition (SCADA) device is connected to the industrial Internet. Moreover, the industrial Internet may be further connected to a mobile terminal of a user, transactions may be completed on the industrial Internet, and all these changes require that an increasing amount of sensitive data needs to be transmitted on the Internet. Therefore, development of the Internet of Things has increasingly high requirements on privacy and security of data transmission, and a security related function needs to be added to device to device (D2D) or machine to machine (M2M) communication. The MQTT protocol in the past cannot satisfy requirements in current Internet of Things communication.

In a known solution, a security function of the MQTT protocol is implemented based on a certificate. In the other solution, a security function of the MQTT protocol is implemented by using the Transport Layer Security (TLS) protocol. In each of the two solutions, two communication parties need to perform a handshake operation a plurality of times, and the current MQTT protocol is changed relatively largely.

SUMMARY

In view of this, embodiments of the present invention provide an MQTT data transmission method, apparatus, and system, so as to provide a solution for simply implementing a security function of the MQTT protocol. In the solution, a conventional protocol does not need to be changed relatively largely, and device implementation is changed relatively little.

According to a first embodiment, an MQTT data sending method is provided. The method relates to one MQTT publishing device, one MQTT broker, one session description protocol (SDP) gateway, and at least one MQTT subscribing device, where the SDP gateway is connected to the at least one MQTT subscribing device. The method is used to securely publish MQTT data to the MQTT subscribing device.

In the method, the MQTT publishing device first sends one SDP connection request to the MQTT broker, where the SDP connection request is used to request to establish a connection to the SDP gateway. After the MQTT broker receives the foregoing SDP connection request from the MQTT publishing device, the MQTT broker determines whether the SDP connection request is allowed, and if the SDP connection request is allowed, the MQTT broker instructs the SDP gateway to wait to establish a connection to the MQTT publishing device, and returns address information of the SDP gateway to the MQTT publishing device.

After receiving the address information of the SDP gateway, the MQTT publishing device establishes a connection to the SDP gateway according to the received address information of the SDP gateway. Optionally, the connection is a security connection such as a VPN connection.

The MQTT publishing device sends identification information of the MQTT publishing device to the SDP gateway by using the established connection to the SDP gateway. Then, the MQTT publishing device sends published data to the MQTT broker, where load of the published data includes the identification information of the MQTT publishing device. The MQTT broker sends the received data to the SDP gateway.

The SDP gateway searches for the identification information of the MQTT publishing device in the load of the received data published by the MQTT publishing device; and if the SDP gateway finds the identification information of the MQTT publishing device, sends the received data published by the MQTT publishing device to the at least one MQTT subscribing device to which the SDP gateway is connected.

A data obtaining relationship between the MQTT publishing device and the MQTT subscribing device is verified before MQTT data publishing, and data sending is controlled by using the SDP gateway. Therefore, security of the MQTT data publishing can be effectively ensured. Moreover, protocol modification is relatively little, and implementation is simple.

According to a second embodiment, a device connection method is provided. The method may be performed by the MQTT broker according to the first embodiment. In the method, one MQTT broker receives one SDP connection request from one MQTT publishing device, where the SDP connection request is used by the MQTT publishing device to establish a connection to one SDP gateway, where the SDP gateway is connected to at least one MQTT subscribing device; the MQTT broker determines whether the SDP connection request is allowed, and if the SDP connection request is allowed, the MQTT broker (302) instructs the SDP gateway to wait to establish a connection to the MQTT publishing device; and the MQTT broker returns address information of the SDP gateway to the MQTT publishing device, where the address information is used by the MQTT publishing device to establish a connection to the SDP gateway according to the address information of the SDP gateway.

The MQTT broker verifies a data obtaining relationship between the MQTT publishing device and the MQTT subscribing device, and controls a connection between the MQTT publishing device and the SDP gateway. Therefore, data sending between MQTT devices that are not authenticated may be avoided.

Optionally, the MQTT broker determines whether the SDP gateway is a preset SDP gateway to which the MQTT publishing device is allowed to be connected, and if yes, determines that the SDP connection request is allowed; otherwise, determines that the SDP connection request is denied.

The MQTT broker may preset an SDP gateway to which the MQTT publishing device may be connected. In this way, after an SDP connection request is received, whether the connection request is allowed may be determined according to a preset correspondence.

Optionally, after the MQTT broker returns the address information of the SDP gateway to the MQTT publishing device, the MQTT broker receives data published by the MQTT publishing device, where the data published by the MQTT publishing device includes identification information of the MQTT publishing device; and the MQTT broker sends, to the SDP gateway, the received data published by the MQTT publishing device.

In a process in which the SDP gateway is applied to publishing of MQTT data, after the MQTT broker verifies a relationship between the MQTT publishing device and the SDP gateway, the MQTT broker forwards the MQTT data. The MQTT broker as an SDP controller and the SDP gateway jointly implement bidirectional authentication on the MQTT publishing device and the MQTT subscribing device.

According to a third embodiment, a device connection method is provided. The method may be performed by the MQTT publishing device according to the first embodiment. In the method, one MQTT publishing device sends one SDP connection request to one MQTT broker, where the SDP connection request is used to request to establish a connection to one SDP gateway, where the SDP gateway is connected to at least one MQTT subscribing device; the MQTT publishing device receives address information of the SDP gateway that is in response to the SDP connection request and from the MQTT broker; and the MQTT publishing device establishes a connection to the SDP gateway according to the received address information of the SDP gateway.

The MQTT broker verifies a data obtaining relationship between the MQTT publishing device and the MQTT subscribing device, and controls a connection between the MQTT publishing device and the SDP gateway. Therefore, data sending between MQTT devices that are not authenticated may be avoided.

Optionally, the MQTT publishing device establishes one security connection to the SDP gateway. In this way, communication between the MQTT publishing device and the SDP gateway is more secure.

Optionally, after the MQTT publishing device establishes a connection to the SDP gateway, the MQTT publishing device sends identification information of the MQTT publishing device to the SDP gateway by using the established connection; and the MQTT publishing device sends published data to the MQTT broker, so as to be sent to the SDP gateway by using the MQTT broker, where load of the published data includes the identification information of the MQTT publishing device.

The MQTT publishing device sends identification information of the MQTT broker by using a connection between the MQTT broker and the SDP gateway, and load of subsequently published data includes the identification information. In this way, the SDP gateway may identify the received data; and if the received data includes the identification information, the SDP gateway considers that the data is secure, or if the received data does not include the identification information, the SDP gateway considers that the data is not secure, so as to verify data that is to be published to the MQTT subscribing device. If a security connection is established between the MQTT publishing device and the SDP gateway, the identification information of the MQTT publishing device is sent by using the security connection, and important information can be effectively prevented from being stolen, thereby further improving security of MQTT data publishing.

According to a fourth embodiment, a data sending method is provided. The method may be performed by the SDP gateway according to the first embodiment. In the method, one SDP gateway receives one piece of indication information from one MQTT broker, where the indication information is used to instruct the SDP gateway to wait to establish a connection to one MQTT publishing device, where the SDP gateway is connected to at least one MQTT subscribing device; after receiving a connection establishment request from the MQTT publishing device, the SDP gateway establishes a connection to the MQTT publishing device; the SDP gateway receives identification information of the MQTT publishing device that is sent by the MQTT publishing device by using the established connection; the SDP gateway receives, from the MQTT broker, data published by the MQTT publishing device; and the SDP gateway searches for the identification information of the MQTT publishing device in the load of the received data published by the MQTT publishing device; and if the SDP gateway finds the identification information of the MQTT publishing device, sends the received data published by the MQTT publishing device to the at least one MQTT subscribing device to which the SDP gateway is connected.

In a process in which the SDP gateway is applied to publishing of MQTT data, after the MQTT broker verifies a relationship between the MQTT publishing device and the SDP gateway, the MQTT broker forwards the MQTT data. The MQTT broker as an SDP controller and the SDP gateway jointly implement bidirectional authentication on the MQTT publishing device and the MQTT subscribing device.

Optionally, after receiving a connection request of establishing one security connection and from the MQTT publishing device, the SDP gateway establishes one security connection to the MQTT publishing device.

The identification information of the MQTT publishing device is sent by using the established security connection, and important information can be effectively prevented from being stolen, thereby further improving security of MQTT data publishing.

According to a fifth embodiment, an MQTT data sending system is provided. Components in the system may implement the method provided in the foregoing first embodiment. The system includes: one MQTT publishing device, one MQTT broker, one SDP gateway, and at least one MQTT subscribing device connected to the SDP gateway, where the MQTT publishing device is configured to send one SDP connection request to the MQTT broker, where the SDP connection request is used by the MQTT publishing device to establish a connection to the SDP gateway; the MQTT broker is configured to determine whether the SDP connection request is allowed, and if the SDP connection request is allowed, instruct the SDP gateway to wait to establish a connection to the MQTT publishing device, and return address information of the SDP gateway to the MQTT publishing device; the MQTT publishing device is further configured to send one connection establishment request to the SDP gateway according to the received address information of the SDP gateway; and the SDP gateway is configured to: after receiving the connection establishment request sent by the MQTT publishing device, establish a connection to the MQTT publishing device.

The MQTT broker verifies a data obtaining relationship between the MQTT publishing device and the MQTT subscribing device, and controls a connection between the MQTT publishing device and the SDP gateway. Therefore, data sending between MQTT devices that are not authenticated may be avoided.

According to a sixth embodiment, an MQTT broker is provided. The MQTT broker may include: one transceiver module, configured to receive one SDP connection request from one MQTT publishing device, where the SDP connection request is used by the MQTT publishing device to establish a connection to one SDP gateway, where the SDP gateway is connected to at least one MQTT subscribing device; and one processing module, configured to determine whether the SDP connection request is allowed, and if the SDP connection request is allowed, instruct, by using the transceiver module, the SDP gateway to wait to establish a connection to the MQTT publishing device; and return, by using the transceiver module, address information of the SDP gateway to the MQTT publishing device, where the address information is used by the MQTT publishing device to establish a connection to the SDP gateway according to the address information of the SDP gateway.

The MQTT broker verifies a data obtaining relationship between the MQTT publishing device and the MQTT subscribing device, and controls a connection between the MQTT publishing device and the SDP gateway. Therefore, data sending between MQTT devices that are not authenticated may be avoided.

Optionally, the processing module is specifically configured to determine whether the SDP gateway is a preset SDP gateway to which the MQTT publishing device is allowed to be connected, and if yes, determine that the SDP connection request is allowed; otherwise, determine that the SDP connection request is denied.

The MQTT broker may preset an SDP gateway to which the MQTT publishing device may be connected. In this way, after an SDP connection request is received, whether the connection request is allowed may be determined according to a preset correspondence.

Optionally, the transceiver module is further configured to: after returning the address information of the SDP gateway to the MQTT publishing device, receive data published by the MQTT publishing device, where the data published by the MQTT publishing device includes identification information of the MQTT publishing device; and send, to the SDP gateway, the received data published by the MQTT publishing device.

In a process in which the SDP gateway is applied to publishing of MQTT data, after the MQTT broker verifies a relationship between the MQTT publishing device and the SDP gateway, the MQTT broker forwards the MQTT data. The MQTT broker as an SDP controller and the SDP gateway jointly implement bidirectional authentication on the MQTT publishing device and the MQTT subscribing device.

According to a seventh embodiment, an MQTT publishing device is provided, including: one transceiver module, configured to send one SDP connection request to one MQTT broker, where the SDP connection request is used to request to establish a connection to one SDP gateway, where the SDP gateway is connected to at least one MQTT subscribing device; and receive address information of the SDP gateway that is in response to the SDP connection request and from the MQTT broker; and one processing module, configured to control, according to the address information of the SDP gateway received by the transceiver module, the MQTT publishing device to establish a connection to the SDP gateway.

The MQTT broker verifies a data obtaining relationship between the MQTT publishing device and the MQTT subscribing device, and controls a connection between the MQTT publishing device and the SDP gateway. Therefore, data sending between MQTT devices that are not authenticated may be avoided.

Optionally, the processing module is specifically configured to control the MQTT publishing device to establish one security connection to the SDP gateway. In this way, communication between the MQTT publishing device and the SDP gateway is more secure.

Optionally, the transceiver module is further configured to: after the processing module controls the MQTT publishing device to establish a connection to the SDP gateway, send identification information of the MQTT publishing device to the SDP gateway by using the established connection; and send, to the MQTT broker, data published by the MQTT publishing device, so as to be sent to the SDP gateway by using the MQTT broker, where load of the published data includes the identification information of the MQTT publishing device.

The MQTT publishing device sends identification information of the MQTT broker by using a connection between the MQTT broker and the SDP gateway, and load of subsequently published data includes the identification information. In this way, the SDP gateway may identify the received data; and if the received data includes the identification information, the SDP gateway considers that the data is secure, or if the received data does not include the identification information, the SDP gateway considers that the data is not secure, so as to verify data that is to be published to the MQTT subscribing device. If a security connection is established between the MQTT publishing device and the SDP gateway, the identification information of the MQTT publishing device is sent by using the security connection, and important information can be effectively prevented from being stolen, thereby further improving security of MQTT data publishing.

According to an eighth embodiment, an SDP gateway is provided, including:

one transceiver module, configured to receive one piece of indication information from one MQTT broker, where the indication information is used to instruct the SDP gateway to wait to establish a connection to one MQTT publishing device, where the SDP gateway is connected to at least one MQTT subscribing device; and receive a connection establishment request from the MQTT publishing device; and one processing module, configured to: after the transceiver module receives the connection establishment request from the MQTT publishing device, establish a connection to the MQTT publishing device, where the transceiver module is further configured to receive identification information of the MQTT publishing device that is sent by the MQTT publishing device by using the established connection; and receive, from the MQTT broker, data published by the MQTT publishing device; and the processing module is further configured to search for the identification information of the MQTT publishing device in load of the data that is published by the MQTT publishing device and that is received by the transceiver module; and if the identification information of the MQTT publishing device is found, send the data that is published by the MQTT publishing device and that is received by the transceiver module to the at least one MQTT subscribing device to which the SDP gateway is connected.

In a process in which the SDP gateway is applied to publishing of MQTT data, after the MQTT broker verifies a relationship between the MQTT publishing device and the SDP gateway, the MQTT broker forwards the MQTT data. The MQTT broker as an SDP controller and the SDP gateway jointly implement bidirectional authentication on the MQTT publishing device and the MQTT subscribing device.

Optionally, the processing module is specifically configured to: after the transceiver module receives a connection request of establishing one security connection and from the MQTT publishing device, establish one security connection to the MQTT publishing device.

The identification information of the MQTT publishing device is sent by using the established security connection, and important information can be effectively prevented from being stolen, thereby further improving security of MQTT data publishing.

According to a ninth embodiment, a data sending apparatus is provided, including at least one processor and at least one memory, where the at least one memory stores a machine readable instruction, and the at least one processor is configured to invoke the machine readable instruction, to perform the method provided in the second embodiment, any possible implementation of the second embodiment, the third embodiment, any possible implementation of the third embodiment, the fourth embodiment, or any possible implementation of the fourth embodiment.

According to a tenth embodiment, a machine readable medium is provided, where the machine readable medium stores a machine readable instruction, and when being invoked by at least one processor, the machine readable instruction is configured to perform the method provided in the second embodiment, any possible implementation of the second embodiment, the third embodiment, any possible implementation of the third embodiment, the fourth embodiment, or any possible implementation of the fourth embodiment.

LIST OF SERIAL NUMBERS IN THE ACCOMPANYING DRAWINGS

| 10: MQTT data processing protocol stack | 101: SDP protocol processing framework | 102: MQTT protocol processing framework |
|---|---|---|
| 1021: Application layer | 1022: Transport layer | 1023: Network layer |
| 20: SDP network | 201: SDP host initiating end | 202: SDP controller |
| 203: SDP host accepting end | 204: SDP gateway | |
| 205: Data channel | 206: Control channel | |
| 30: MQTT data sending system | 301: MQTT publishing device | 302: MQTT broker |
| 303: MQTT subscribing device | 401: MQTT data | 402: SDP message |
| S501: SDP connection request | | S502: Determine whether the SDP connection request is allowed |
| S503: Instruct an SDP gateway 204 to wait to establish a connection to an MQTT publishing device 301 | | |
| S504: Address information of the SDP gateway 204 | | |
| S505: An MQTT publishing device 301 establishes a connection to the SDP gateway 204 | | |
| S506: Identification information of the MQTT publishing device 301 | | |
| S507: Record the identification information of the MQTT publishing device 301 | | |
| S508: Sending published data, where load of the data includes the identification information of the MQTT publishing device 301 | | |
| S509: Send data published by the MQTT publishing device 301 | | |
| S510: Search for the identification information of the MQTT publishing device 301 in the load of the received data | | |
| S511: Send, to at least one connected MQTT subscribing device 303, the data published by the MQTT publishing device 301 | | |
| 3021: Transceiver module | 3022: Processing module | 3011: Transceiver module |
| 3012: Processing module | 2041: Transceiver module | 2042: Processing module |
| 90: Data sending apparatus | 901: At least one processor | 902: At least one memory |

DETAILED DESCRIPTION OF THE INVENTION

As described above, the MQTT protocol in the past cannot satisfy security related requirements in current Internet of Things communication. In embodiments of the present invention, a data obtaining relationship between an MQTT publishing device and an MQTT subscribing device is verified before MQTT data publishing, and data sending is controlled by using an SDP gateway. Therefore, security of the MQTT data publishing can be effectively ensured. Moreover, protocol modification is relatively little, and implementation is simple.

The embodiments of the present invention are described in detail below with reference to accompanying drawings.

Figure 1:
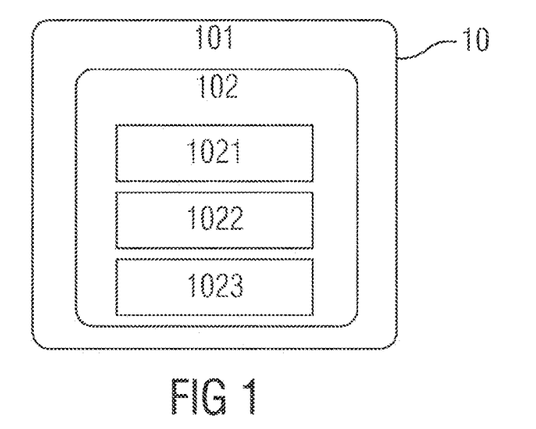
FIG. 1 is a schematic structural diagram of layering of protocols according to an embodiment of the present invention.

FIG. 1 is a schematic structural diagram of layering of protocols according to an embodiment of the present invention. As shown in FIG. 1, an MQTT data processing protocol stack 10 includes:
one outer SDP protocol processing framework 101; and
one inner MQTT protocol processing framework 102.
The inner MQTT protocol processing framework 102 may include:
1) an application layer 1021
2) a transport layer 1022, and
3) a network layer 1023.

Optionally, to more effectively prevent behaviors with a network security threat such as snooping, spoofing, and a man-in-the-middle attack (MITM), authentication, load encryption, and the like may be added to some or all of the foregoing inner layers in this embodiment of the present invention.

For example, for the network layer 1023, a physical encryption network or virtual private network (VPN) may be used as a network communication mechanism. MQTT data transmission based on a secure network layer such as a VPN may have advantages such as functions, security, and management of a private network.

For another example, for the transport layer 1022, a security function of the MQTT protocol may be implemented by using a series of protocols such as the Transport Layer Security (TLS) protocol and/or the Secure Sockets Layer (SSL) protocol. The SSL protocol supports a plurality of functions such as key exchange, data encryption, and message integrity protection.

For still another example, for the application layer 1021, a plurality of encryption manners such as a client identifier, a user name, and a password may be provided. Moreover, encryption processing may be performed on a load part.

In this embodiment of the present invention, in addition to the MQTT protocol processing framework 102, the SDP protocol processing framework 101 is further added, and a relatively comprehensive security function may be provided. By using the SDP protocol, login information may be processed by way of single packet authorization (SPA). Therefore, a data receive end may be protected, and a hacker cannot find the data receive end. Regardless of whether an SSL/TLS transmission mechanism is used, security of an authentication process can be ensured as long as processing is performed by using the SDP protocol. Optionally, before reaching the application layer, each of device state information (posture) and an identifier may be verified.

An overwhelming majority of mobile terminals and conventional industrial device in the industrial Internet do not have a sufficient operational capability, so as to insufficiently support a security function implemented by the foregoing application layer or transport layer. Therefore, for a device whose operational capability is limited, it may be considered that the security function of the MQTT protocol is implemented by using only the outer SDP protocol processing framework 101, and the security function does not need to be added to each inner layer of the MQTT protocol. However, for a device that has a sufficient operational capability, the outer SDP protocol processing framework 101 may be used, and security processing is performed on one or more inner layers of the MQTT protocol.

Figure 2:
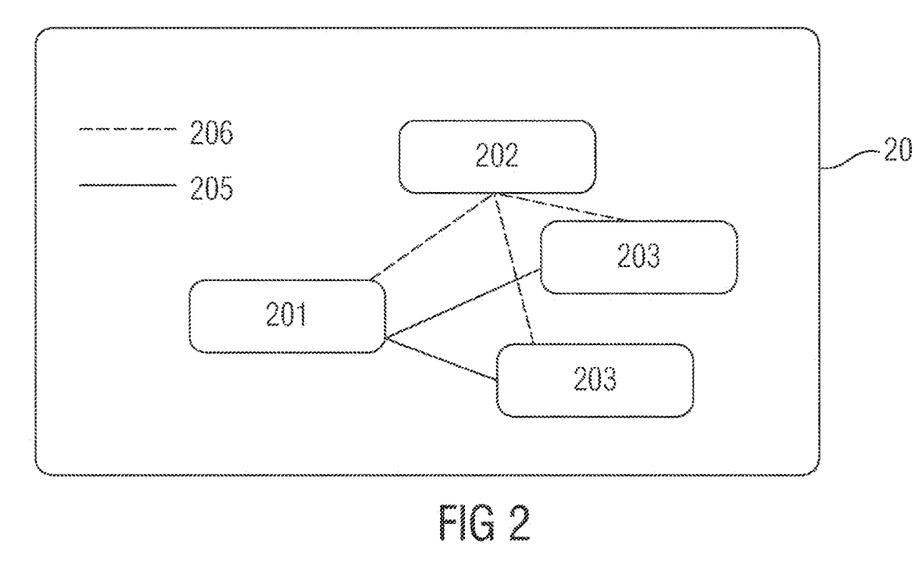
FIG. 2 is a principle diagram of the SDP protocol.

To make this embodiment of the present invention more easily comprehensible, a principle of the SDP protocol related to the outer SDP protocol processing framework 101 is described below.

One SDP network 20 may include: an SDP host, an SDP controller 202, and an SDP gateway 204.

1) SDP Host

The SDP host implements numerous functions that may include: device verification, user authentication, sending data of an application in a local whitelist to a remote application that is authorized and protected, and the like. The SDP host may include an SDP host initiating end 201 and an SDP host accepting end 203.

2) SDP Controller 202

The SDP controller 202 is a trustworthy intermediate device between SDP hosts, and may configure the SDP host and the SDP gateway in real time.

3) SDP Gateway 204

The SDP gateway 204 is a termination point of a connection from the SDP host, and is generally neighboring to a protected application as much as possible in a network topology structure.

A related process of the SDP protocol may include:
1) One SDP controller 202 is online, and is connected to a service that is authenticated and authorized.
2) An SDP gateway 204 is online, and is connected to the SDP controller 202.
3) An SDP host initiating end 201 is online, and is connected to the SDP controller 202.
4) The SDP controller 202 determines a list of SDP gateways 204.
5) The SDP controller 202 instructs the SDP gateway 204 to accept communication from the SDP host initiating end 201.
6) The SDP controller 202 sends the list of SDP gateways 204 to the SDP host initiating end 201.
7) The SDP host initiating end 201 initiates a bidirectional VPN connection to all authorized SDP gateways 204.

In this embodiment of the present invention, SDP protocol processing is added outside the MQTT protocol processing framework 102, thereby implementing a security function of MQTT data sending. In device implementation, processing of the SDP host initiating end is added to one MQTT publishing device, processing of the SDP controller is added to one MQTT broker, and processing of the SDP host accepting end is added to one MQTT subscribing device respectively. Moreover, an SDP gateway is added to a side of the MQTT subscribing device, the SDP controller implements security verification on data transmission between the MQTT subscribing device and the MQTT publishing device, and the SDP gateway controls data sending from the MQTT publishing device to the MQTT subscribing device. An MQTT data sending system 30 provided in an embodiment of the present invention is described below with reference to FIG. 3.

Figure 3:
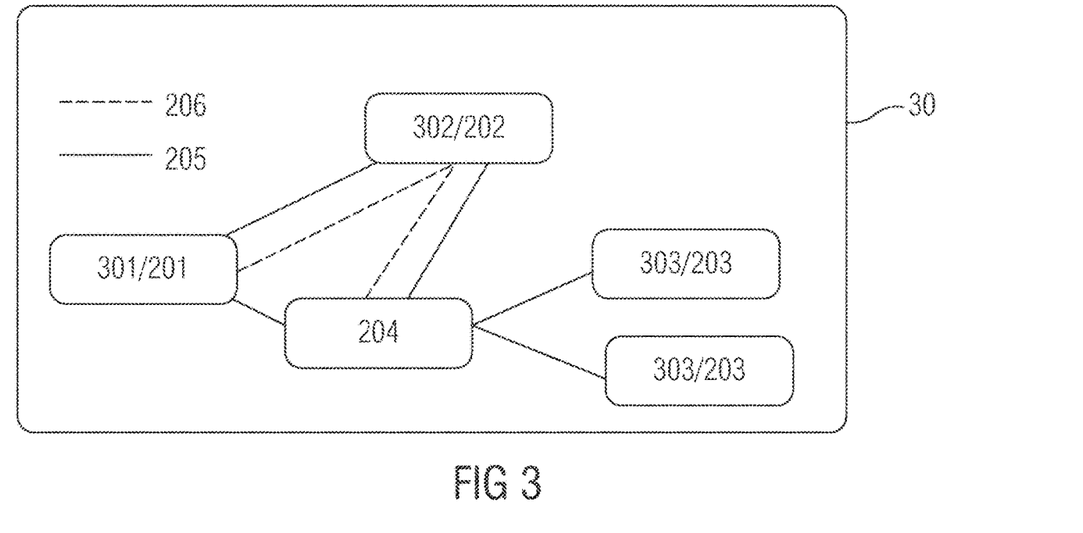
FIG. 3 is a schematic structural diagram of an MQTT data sending system according to an embodiment of the present invention.

As shown in FIG. 3, the MQTT data sending system 30 includes:

one MQTT publishing device 301 that implements a function of an SDP host initiating end 201, and initiates an SDP connection request to one MQTT broker 302 as an SDP controller 202;

the MQTT broker 302 that implements a function of the SDP controller 202, and performs security verification on data transmission between the MQTT publishing device 301 and one MQTT subscribing device 303;

one SDP gateway 204 that establishes a connection to the MQTT publishing device 301, and controls data sending from the MQTT publishing device 301 to the MQTT subscribing device 303; and at least one MQTT subscribing device 303 that is connected to the SDP gateway 204 on a side of the MQTT subscribing device 303, and receives, from the connected SDP gateway 204, data published by the MQTT publishing device 301. During specific implementation, there may be a plurality of SDP gateways 204 separately forwarding data to the at least one connected MQTT subscribing device 303.

A principle of performing, by the MQTT broker 302 as the SDP controller 202, security verification on data transmission between the MQTT publishing device 301 and the MQTT subscribing device 303 is described below. Login information of the MQTT publishing device 301 may be transferred by using the single packet authorization (SPA) mechanism, so as to perform security verification on data transmission between the MQTT publishing device 301 and the MQTT subscribing device 303. Because each SPA packet has one random and one-time field different from that of another SPA packet, it is difficult for a hacker to pass through the SPA verification mechanism by using one fake SPA packet. In addition, the foregoing one-time field in one SPA packet may be implemented by using a keyed-hash message authentication code (HMAC) signature. Unless all related SDP encryption information is obtained, it is difficult for a hacker to fake one SPA packet, to pass through the SPA verification mechanism.

Figure 4:
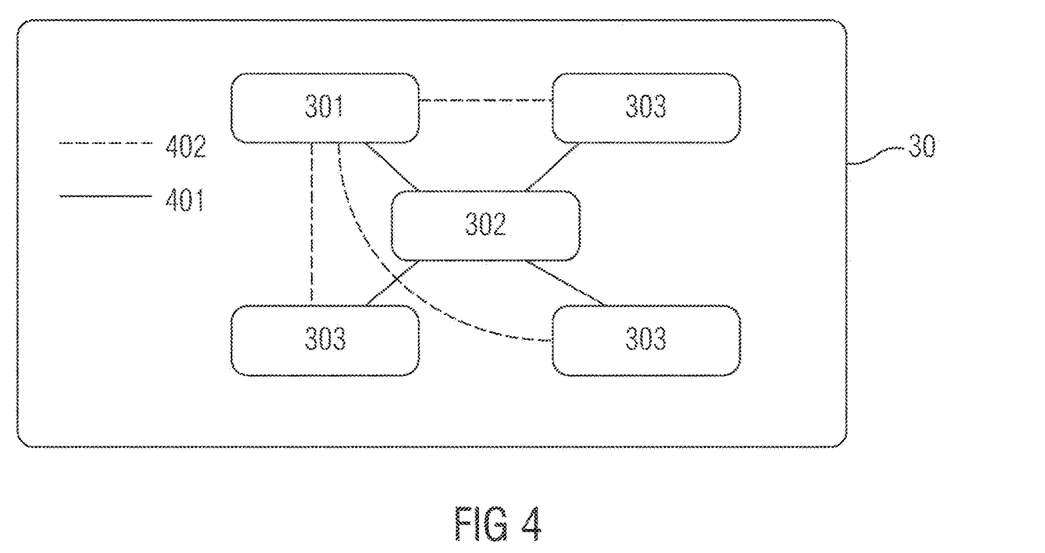
FIG. 4 is a schematic diagram of applying the SDP protocol to MQTT data sending according to an embodiment of the present invention.

In FIG. 4, an MQTT subscribing device 303 as an SDP host accepting end 203 subscribes to one topic provided by an MQTT broker 302 from the MQTT broker 302 as an SDP controller 202. After establishing a connection to the MQTT broker 302, the MQTT subscribing device 303 as a client may perform topic subscription and data transmission. When there is a connection, the SDP protocol mechanism may ensure that there is no counterfeit MQTT client in a network.

A process of the MQTT protocol includes the following steps:

1) Connection: the MQTT subscribing device 303 as a client waits to establish a connection to the MQTT broker 302 as a server.

2) Connection interruption: after the MQTT subscribing device 303 as the client completes data transmission, the MQTT broker 302 as the server interrupts a TCP/IP connection.

3) Subscription: the MQTT broker 302 as the server waits for a subscription operation or subscription cancellation operation of the MQTT subscribing device 303 as the client.

4) Subscription cancellation: the MQTT subscribing device 303 as the client requests the MQTT broker 302 as the server to cancel subscription to at least one topic.

5) Publishing: after transferring the request of the MQTT subscribing device 303 to the MQTT publishing device 301, the MQTT broker 302 immediately returns to an application thread.

In FIG. 4, a solid line between devices indicates an SPA authorization process of performing security verification on data transmission between the MQTT broker 302 and the MQTT subscribing device 303, and a dashed line between devices indicates a process in which the MQTT publishing device 301 publishes data (such as a topic) to the MQTT subscribing device 303 by using the MQTT broker 302.

Figure 5:
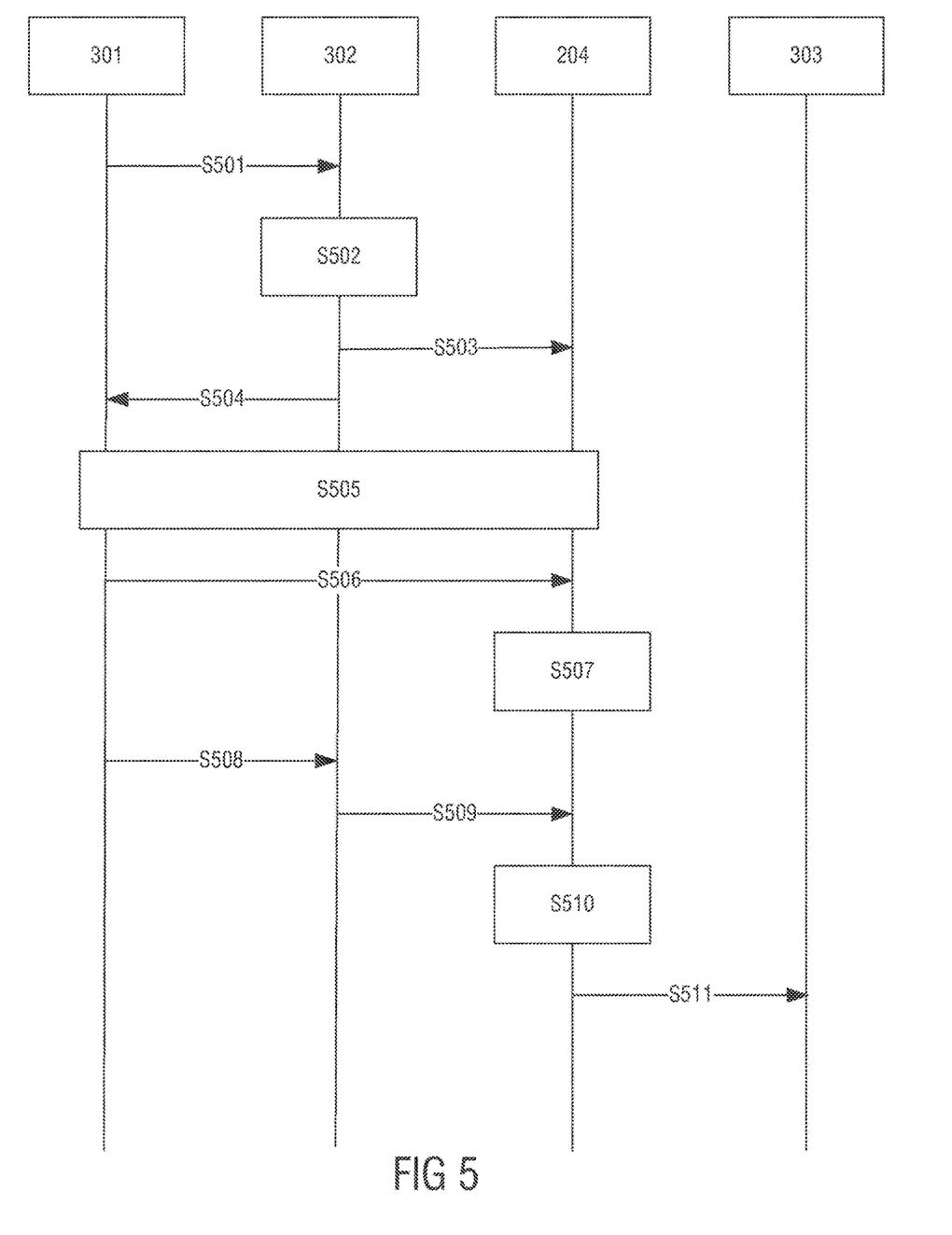
FIG. 5 is a flowchart of an MQTT data sending method according to an embodiment of the present invention.

A process of an MQTT data sending method in an embodiment of the present invention is described below with reference to FIG. 5. As shown in FIG. 5, the method may include the following steps.

S501: An MQTT publishing device 301 sends an SDP connection request to an MQTT broker 302. The connection request may include an Internet Protocol (IP) address of the MQTT publishing device 301, and names of the MQTT publishing device 301 and a connected SDP gateway 204.

S502: The MQTT broker 302 determines whether the SDP connection request is allowed. If the SDP connection request is allowed, step S503 is performed.

Optionally, the MQTT broker 302 determines whether the SDP gateway 204 is a preset SDP gateway to which the MQTT publishing device 301 is allowed to be connected, and if yes, determines that the SDP connection request is allowed; otherwise, determines that the SDP connection request is denied, and then the MQTT broker 302 denies the SDP connection request of the MQTT publishing device 301. Optionally, the MQTT broker 302 may reply to the MQTT publishing device 301 with a denial message; or discards the SDP connection request of the MQTT publishing device 301, and does not perform S504 or subsequent steps.

A data transmission relationship between the MQTT publishing device 301 (IP address) and the SDP gateway 204 (name) may be stored in advance in the MQTT broker 302. Then, after receiving the SDP connection request, the MQTT broker 302 may determine, according to the data transmission relationship stored in advance, whether the SDP connection request is allowed. If there is the data transmission relationship, the MQTT broker 302 determines that the SDP connection request is allowed; otherwise, determines that the SDP connection request is not allowed.

S503: The MQTT broker 302 instructs the SDP gateway 204 to wait to establish a connection to the MQTT publishing device 301.

For example, the MQTT broker 302 is to send the IP address of the MQTT publishing device 301 to the SDP gateway 204, and may indicate that a connection establishment request from the IP address is to be received in a subsequent preset time length.

S504: The MQTT broker 302 sends address information of the SDP gateway 204 to the MQTT publishing device 301.

For example, the MQTT broker 302 may send an IP address of the SDP gateway 204 to the MQTT publishing device 301.

Optionally, before step S503 and step S504, the MQTT broker 302 may further verify a user identity of the MQTT publishing device 301, and a verification manner includes but is not limited to: one-time token verification, public key infrastructure (PKI) verification, fingerprint verification, device geographic location verification, and the like.

S505: The MQTT publishing device 301 establishes a connection to the SDP gateway 204. Optionally, the established connection is a security connection such as a virtual private network (VPN) connection.

S506: The MQTT publishing device 301 sends identification information of the MQTT publishing device 301 to the SDP gateway 204 by using the established connection to the SDP gateway 204 in step S505. If a security connection is established in step S505, transmission of the identification information in step S506 is more secure and reliable.

S507: The SDP gateway 204 records the received identification information of the MQTT publishing device 301.

S508: The MQTT publishing device 301 sends published data to the MQTT broker 302, where load of the data includes the identification information of the MQTT publishing device 301.

S509: The MQTT broker 302 sends, to the SDP gateway 204, data published by the MQTT publishing device 301.

S510: The SDP gateway 204 searches for the identification information of the MQTT publishing device 301 in the load of the received data. If the identification information is found, step S511 is performed; otherwise, the received data may be discarded.

S511: The SDP gateway 204 sends, to at least one connected MQTT subscribing device 303, the data published by the MQTT publishing device 301.

Optionally, in step S501, the MQTT publishing device 301 may not designate an SDP gateway 204 to which the MQTT publishing device 301 needs to be connected, and in step S502, the MQTT broker 302 may store in advance or obtain, from another device after receiving the SDP connection request of the MQTT publishing device 301, SDP gateways 204 to which the MQTT publishing device 301 may be connected. Then, in step S503, the MQTT broker 302 may instruct all the SDP gateways 204 to which the MQTT publishing device 301 may be connected to wait for the connection establishment request of the MQTT publishing device 301. In step S504, the MQTT broker 302 may return, to the MQTT publishing device 301, address information of all the SDP gateways 204 to which the MQTT publishing device 301 may be connected. In this way, in step S505, the MQTT publishing device 301 may establish, according to the address information received in step S504, a connection to all the SDP gateways 204 to which the MQTT publishing device 301 may be connected. Moreover, in a subsequent step, the MQTT publishing device 301 sends the identification information of the MQTT publishing device 301 to all MQTT brokers 302 to which the MQTT publishing device 301 may be connected, and after receiving the data published by the MQTT publishing device 301, the MQTT brokers 302 send the received data to all the SDP gateways 204 to which the MQTT publishing device 301 may be connected. Then, the data published by the MQTT publishing device 301 may be sent to an MQTT subscribing device 303 to which each SDP gateway 204 is connected.

The MQTT protocol supports three levels of quality of service (QoS): QoS 0, QoS 1, and QoS 2. In QoS 0, a best-effort delivery mechanism is used, and a message receive end neither confirms message receiving, nor stores a received message to wait for a transmit end to perform retransmission. In QoS 1, it is ensured that a message is sent to the receive end at least once. The transmit end stores the message until confirmation of the receive end is received. QoS 2 is a most secure mechanism, but data transmission is at a lowest speed, to ensure that each set of messages are received by a peer at least once. It should be noted that, this embodiment of the present invention is applicable to QoS 1 and QoS 2.

Figure 6:
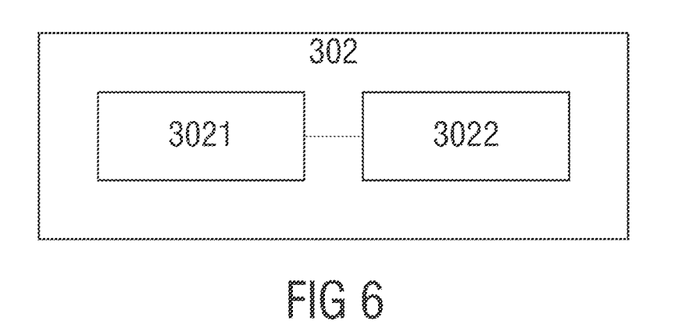
FIG. 6 is a schematic structural diagram of an MQTT broker according to an embodiment of the present invention.

FIG. 6 is a schematic structural diagram of an MQTT broker 302 according to an embodiment of the present invention. As shown in FIG. 6, the MQTT broker 302 may include:

one transceiver module 3021, configured to receive one SDP connection request from one MQTT publishing device 301, where the SDP connection request is used by the MQTT publishing device 301 to establish a connection to one SDP gateway 204, where the SDP gateway 204 is connected to at least one MQTT subscribing device 303; and one processing module 3022, configured to determine whether the SDP connection request is allowed, and if the SDP connection request is allowed, instruct, by using the transceiver module 3021, the SDP gateway 204 to wait to establish a connection to the MQTT publishing device 301; and return, by using the transceiver module 3021, address information of the SDP gateway 204 to the MQTT publishing device 301, where the address information is used by the MQTT publishing device 301 to establish a connection to the SDP gateway 204 according to the address information of the SDP gateway 204.

Optionally, the processing module 3022 is specifically configured to determine whether the SDP gateway 204 is a preset SDP gateway to which the MQTT publishing device 301 is allowed to be connected, and if yes, determine that the SDP connection request is allowed; otherwise, determine that the SDP connection request is denied.

Optionally, the transceiver module 3022 is further configured to: after returning the address information of the SDP gateway 204 to the MQTT publishing device 301, receive data published by the MQTT publishing device 301, where the data published by the MQTT publishing device 301 includes identification information of the MQTT publishing device 301; and send, to the SDP gateway 204, the received data published by the MQTT publishing device 301.

For another optional implementation of the MQTT broker 302, refer to the description in the MQTT data sending system and the MQTT data sending method that are described above. The transceiver module 3022 is configured to implement message and data receiving and transmission operations, and the processing module 3022 is configured to perform determining processing.

Figure 7:
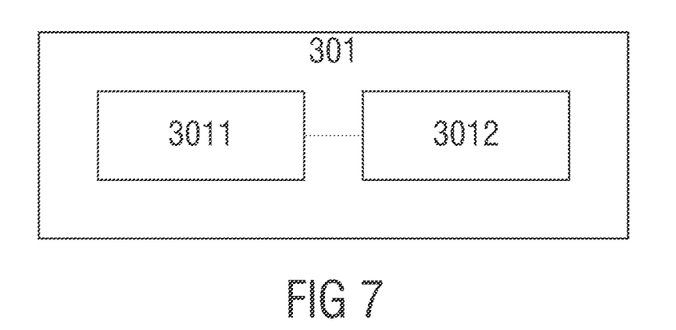
FIG. 7 is a schematic structural diagram of an MQTT publishing device according to an embodiment of the present invention.

FIG. 7 is a schematic structural diagram of an MQTT publishing device 301 according to an embodiment of the present invention. As shown in FIG. 7, the MQTT publishing device 301 may include:

one transceiver module 3011, configured to send one SDP connection request to one MQTT broker 302, where the SDP connection request is used to request to establish a connection to one SDP gateway 204, where the SDP gateway 204 is connected to at least one MQTT subscribing device 303; and receive address information of the SDP gateway 204 that is in response to the SDP connection request and from the MQTT broker 302; and one processing module 3012, configured to control, according to the address information of the SDP gateway 204 received by the transceiver module 3011, the MQTT publishing device 301 to establish a connection to the SDP gateway 204.

Optionally, the processing module 3012 is specifically configured to control the MQTT publishing device 301 to establish one security connection to the SDP gateway 204.

Optionally, the transceiver module 3011 is further configured to: after the processing module 3012 controls the MQTT publishing device 301 to establish a connection to the SDP gateway 204, send identification information of the MQTT publishing device 301 to the SDP gateway 204 by using the established connection; and send, to the MQTT broker 302, data published by the MQTT publishing device 301, so as to be sent to the SDP gateway 204 by using the MQTT broker 302, where load of the published data includes the identification information of the MQTT publishing device 301.

For another optional implementation of the MQTT publishing device, refer to the description in the MQTT data sending system and the MQTT data sending method that are described above. The transceiver module 3011 is configured to implement message and data receiving and transmission operations, and the processing module 3012 is configured to perform message processing.

Figure 8:
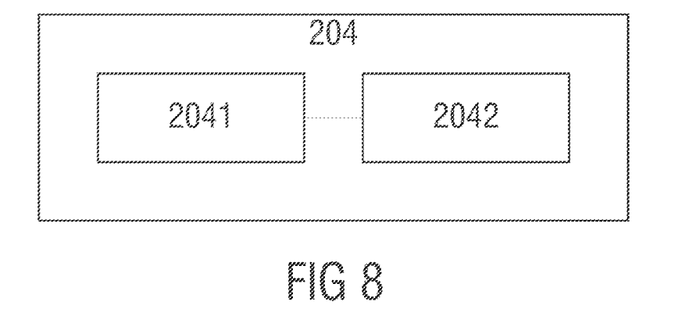
FIG. 8 is a schematic structural diagram of an SDP gateway according to an embodiment of the present invention.

FIG. 8 is a schematic structural diagram of an SDP gateway 204 according to an embodiment of the present invention. As shown in FIG. 8, the SDP gateway 204 may include: one transceiver module 2041, configured to receive one piece of indication information from one MQTT broker 302, where the indication information is used to instruct the SDP gateway 204 to wait to establish a connection to one MQTT publishing device 301, where the SDP gateway 204 is connected to at least one MQTT subscribing device 303; and receive a connection establishment request from the MQTT publishing device 301; and one processing module 2042, configured to: after the transceiver module 2041 receives the connection establishment request from the MQTT publishing device 301, establish a connection to the MQTT publishing device 301, where the transceiver module 2041 is further configured to receive identification information of the MQTT publishing device 301 that is sent by the MQTT publishing device 301 by using the established connection; and receive, from the MQTT broker 302, data published by the MQTT publishing device 301; and the processing module 2042 is further configured to search for the identification information of the MQTT publishing device 301 in load of the data that is published by the MQTT publishing device 301 and that is received by the transceiver module 2041; and if the identification information of the MQTT publishing device 301 is found, send the data that is published by the MQTT publishing device 301 and that is received by the transceiver module 2041 to the at least one MQTT subscribing device 303 to which the SDP gateway 204 is connected.

Optionally, the processing module 2042 is specifically configured to: after the transceiver module 2041 receives a connection request of establishing one security connection and from the MQTT publishing device 301, establish one security connection to the MQTT publishing device 301.

For another optional implementation of the SDP gateway, refer to the description in the MQTT data sending system and the MQTT data sending method that are described above. The transceiver module 2041 is configured to implement message and data receiving and transmission operations, and the processing module 2042 is configured to perform message processing.

Figure 9:
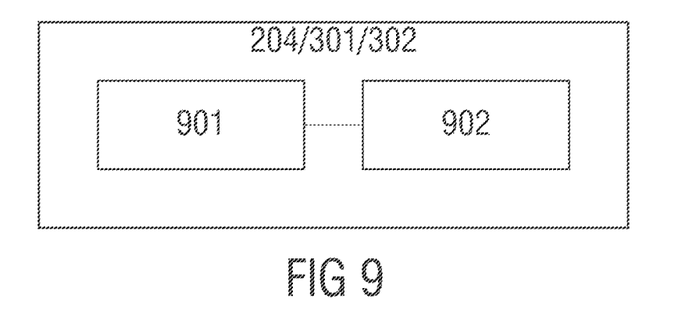
FIG. 9 is a schematic structural diagram of a data sending apparatus according to an embodiment of the present invention.

FIG. 9 is a schematic structural diagram of a data sending apparatus 90 according to an embodiment of the present invention. The data sending apparatus 90 may be any one of the MQTT broker 302, the MQTT publishing device 301, or the SDP gateway 204 described above. The apparatus 90 may include: at least one processor 901 and at least one memory 902, where the at least one memory 902 stores a machine readable instruction, and the at least one processor 901 is configured to invoke the machine readable instruction, to perform an operation performed by any one of the MQTT broker 302, the MQTT publishing device 301, or the SDP gateway 204 in the foregoing method. A structure shown in FIG. 9 may also be considered as a hardware implementation of any device in FIG. 6 to FIG. 8.

Moreover, an embodiment of the present invention further provides a machine readable medium, storing a machine readable instruction, where when being invoked by at least one processor, the machine readable instruction is configured to perform the method performed by any one of the MQTT broker 302, the MQTT publishing device 301, or the SDP gateway 204 in the foregoing method. The machine readable medium may be a floppy disk, a hard disk, a memory, a magneto-optical disc, an optical disc, a magnetic tape, or a non-volatile storage card. Alternatively, the storage medium may be a storage resource in a remote server (such as an application server, where the remote server may be deployed on a cloud).

In conclusion, in the embodiments of the present invention, a security function of MQTT data transmission is implemented by using the SDP. Optionally, double-layer protection may be implemented, that is, the data transmission relationship between the MQTT publishing device 301 and the MQTT subscribing device 303 is verified by using the SDP, and security protection over protocol layers of MQTT is implemented by way of SSL/TLS, a VPN, and load encryption. Bidirectional verification of the MQTT broker 302 and the SDP gateway 204 is implemented by using the SDP mechanism; and after an SDP connection is established, the MQTT broker 302 sends the identification information of the MQTT broker 302 to the SDP gateway 204, and published data includes the identification information of the MQTT broker 302, thereby verifying MQTT data by using the SDP gateway 204. A device change is mainly reflected in changes on the MQTT broker 302 and the MQTT publishing device 301. By adding an SDP gateway 204, the MQTT publishing device 301 does not need to be changed relatively largely. However, for either of the foregoing two solutions for implementing a security function of the MQTT protocol based on a certificate and by way of TLS, the MQTT publishing device 301 and a large quantity of MQTT subscribing devices 303 need to be changed.

The foregoing security function of the MQTT protocol implemented based on a certificate is a security function implemented at the application layer, and the security function of the MQTT protocol implemented by using the TLS protocol is a security function implemented at the transport layer. However, an overwhelming majority of mobile terminals and conventional industrial device in the industrial Internet do not have a sufficient operational capability, so as to insufficiently support a security function implemented by the foregoing application layer or transport layer. However, in the embodiments of the present invention, the security function of the MQTT protocol is implemented by using the SDP protocol. Even if data at the application layer is not encrypted, data transmission between devices is still secure. Because the SPA mechanism is used in the SDP protocol, the MQTT broker 302 as a receive end of a connection may discard all firewall mechanisms (using the SDP gateway 204 as a firewall). Therefore, each device in the MQTT data sending system 30 may be protected from security threats such as a distributed denial-of-service attack (DDoS) and port scanning.

It should be noted that, not all steps and modules in the foregoing processes and system structure diagrams are necessary, and some steps or modules may be omitted according to actual needs. A sequence of performing steps is not fixed, and may be adjusted according to needs. A system structure described in each of the foregoing embodiments may be a physical structure, or may be a logical structure, that is, some modules may be implemented by a same physical entity, or some modules may be respectively implemented by a plurality of physical entities or may be implemented jointly by some components in a plurality of independent devices.

In the foregoing embodiments, a hardware unit may be implemented in a mechanical manner or an electrical manner. For example, one hardware unit may include a permanent dedicated circuit or logic (such as a dedicated processor, FPGA, or ASIC) to complete a corresponding operation. The hardware unit may further include a programmable logic or circuit (such as a general-purpose processor or another programmable processor), and may be provisionally set by software to complete a corresponding operation. A specific implementation (a mechanical manner, a dedicated permanent circuit, or a provisionally set circuit) may be determined in consideration of costs and time.

The present invention is presented and described in detail above by using the accompanying drawings and preferred embodiments. However, the present invention is not limited to these disclosed embodiments. Based on the foregoing plurality of embodiments, a person skilled in the art can learn that, code auditing aspects/devices in the foregoing different embodiments may be combined to obtain more embodiments of the present invention, and these embodiments also fall within the protection scope of the present invention.

What is claimed is:

1. A device connection method, comprising:
receiving, by one Message Queuing Telemetry Transport (MQTT) broker, one session description protocol (SDP) connection request from one MQTT publishing device, the one SDP connection request being usable by the one MQTT publishing device to establish a connection to one SDP gateway, and the one SDP gateway being connectable to at least one MQTT subscribing device;
determining, by the one MQTT broker, whether the one SDP connection request is allowed, and upon the determining indicating that the one SDP connection request is allowed, instructing, by the one MQTT broker, the one SDP gateway to wait to establish a connection to the one MQTT publishing device; and
returning, by the one MQTT broker, address information of the one SDP gateway to the one MQTT publishing device, the address information being usable by the one MQTT publishing device to establish a connection to the one SDP gateway according to the address information of the one SDP gateway.

2. The method of claim 1, wherein the determining, by the one MQTT broker, of whether the one SDP connection request is allowed comprises:
determining, by the one MQTT broker, whether the one SDP gateway is a preset SDP gateway to which the one MQTT publishing device is allowed to be connected; and
determining that the SDP connection request is allowed upon the determining indicating that the one SDP gateway is a preset SDP gateway to which the one MQTT publishing device is allowed to be connected, and
determining that the SDP connection request is denied upon the determining indicating that the one SDP gateway is not a preset SDP gateway to which the one MQTT publishing device is allowed to be connected.

3. The method of claim 1, wherein after the returning, by the one MQTT broker, address information of the one SDP gateway to the one MQTT publishing device, the method further comprises:
receiving, by the one MQTT broker, data published by the one MQTT publishing device, the data published by the one MQTT publishing device including identification information of the one MQTT publishing device; and
sending, by the one MQTT broker to the one SDP gateway, the data, published by the one MQTT publishing device, received.

4. A data sending apparatus, comprising:
at least one memory to store a machine readable instruction; and
at least one processor, configured to invoke the machine readable instruction, to perform at least:
receiving, by one MQTT broker, one SDP connection request from one MQTT publishing device, the one SDP connection request being used by the one MQTT publishing device to establish a connection to one SDP gateway and the one SDP gateway being connected to at least one MQTT subscribing device;
determining, by the one MQTT broker, whether the one SDP connection request is allowed, and upon the determining indicating that the one SDP connection request is allowed, instructing, by the one MQTT broker, the one SDP gateway to wait to establish a connection to the one MQTT publishing device; and
returning, by the one MQTT broker, address information of the one SDP gateway to the one MQTT publishing device, the address information being usable by the one MQTT publishing device to establish a connection to the one SDP gateway according to the address information of the one SDP gateway.

5. The apparatus of claim 4, wherein upon the determining, by the one MQTT broker, of whether the one SDP connection request is allowed, the at least one processor is further configured to invoke the machine readable instruction to perform at least:
determining, by the one MQTT broker, whether the one SDP gateway is a preset SDP gateway to which the one MQTT publishing device is allowed to be connected; and
determining that the SDP connection request is allowed upon the determining indicating that the one SDP gateway is a preset SDP gateway to which the one MQTT publishing device is allowed to be connected, and
determining that the SDP connection request is denied upon the determining indicating that the one SDP gateway is not a preset SDP gateway to which the one MQTT publishing device is allowed to be connected.

6. The apparatus of claim 4, wherein after the returning, by the one MQTT broker, address information of the one SDP gateway to the one MQTT publishing device, the at least one processor is further configured to invoke the machine readable instruction to perform at least:
receiving, by the one MQTT broker, data published by the one MQTT publishing device, the data published by the one MQTT publishing device including identification information of the one MQTT publishing device; and
sending, by the one MQTT broker to the one SDP gateway, the data, published by the one MQTT publishing device, received.

7. A non-transitory machine readable medium, storing a machine readable instruction, wherein when being invoked by at least one processor, the machine readable instruction is configured to perform at least:
receiving, by one Message Queuing Telemetry Transport (MQTT) broker, one session description protocol (SDP) connection request from one MQTT publishing device, the one SDP connection request being usable by the one MQTT publishing device to establish a connection to one SDP gateway, and the one SDP gateway being connectable to at least one MQTT subscribing device;

determining, by the one MQTT broker, whether the one SDP connection request is allowed, and upon the determining indicating that the one SDP connection request is allowed, instructing, by the one MQTT broker, the one SDP gateway to wait to establish a connection to the one MQTT publishing device; and returning, by the one MQTT broker, address information of the one SDP gateway to the one MQTT publishing device, the address information being usable by the one MQTT publishing device to establish a connection to the one SDP gateway according to the address information of the one SDP gateway.

8. The non-transitory machine readable medium of claim 7, wherein upon determining, by the one MQTT broker, of whether the one SDP connection request is allowed, the machine readable instruction is further configured to perform:

determining, by the one MQTT broker, whether the one SDP gateway is a preset SDP gateway to which the one MQTT publishing device is allowed to be connected; and determining that the SDP connection request is allowed upon the determining indicating that the one SDP gateway is a preset SDP gateway to which the one MQTT publishing device is allowed to be connected, and determining that the SDP connection request is denied upon the determining indicating that the one SDP gateway is not a preset SDP gateway to which the one MQTT publishing device is allowed to be connected.

9. The non-transitory machine readable medium of claim 7, wherein after the returning, by the one MQTT broker, address information of the one SDP gateway to the one MQTT publishing device, the machine readable instruction is further configured to perform:

receiving, by the one MQTT broker, data published by the one MQTT publishing device, the data published by the one MQTT publishing device including identification information of the one MQTT publishing device; and sending, by the one MQTT broker to the one SDP gateway, the data, published by the one MQTT publishing device, received.

* * * * *